US012079731B2

(12) United States Patent
Gan et al.

(10) Patent No.: US 12,079,731 B2
(45) Date of Patent: *Sep. 3, 2024

(54) AUDIOVISUAL SOURCE SEPARATION AND LOCALIZATION USING GENERATIVE ADVERSARIAL NETWORKS

(71) Applicant: International Business Machines Corporation, Armonk, NY (US)

(72) Inventors: Chuang Gan, Cambridge, MA (US); Yang Zhang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,848

(22) Filed: Oct. 20, 2022

(65) Prior Publication Data

US 2023/0044635 A1    Feb. 9, 2023

Related U.S. Application Data

(63) Continuation of application No. 16/394,261, filed on Apr. 25, 2019, now Pat. No. 11,501,532.

(51) Int. Cl.
*G06V 20/40*  (2022.01)
*G06N 3/045*  (2023.01)
(Continued)

(52) U.S. Cl.
CPC ............. *G06N 3/088* (2013.01); *G06N 3/045* (2023.01); *G06V 10/764* (2022.01); *G06V 10/82* (2022.01);
(Continued)

(58) Field of Classification Search
CPC ... G06N 3/088; G06N 3/045; G06V 20/40–49
See application file for complete search history.

(56) References Cited

U.S. PATENT DOCUMENTS 8,602,887 B2    12/2013  Tardif et al.
11,501,532 B2 *  11/2022  Gan ...................... G06V 20/48
(Continued)

FOREIGN PATENT DOCUMENTS

CN       102289564 A     12/2011
DE    112020000548 T5    10/2021
(Continued)

OTHER PUBLICATIONS

Zhou et al "Talking Face Generation by Adversarially Disentangled Audio-Visual Representation" arXiv 2018 (Year: 2018).*

(Continued)

*Primary Examiner* — Sean T Motsinger
(74) *Attorney, Agent, or Firm* — Robert D. Bean (57) ABSTRACT

A method (and structure and computer product) for an audiovisual source separation processing, including receiving video data including images of a plurality of sound sources, receiving an optical flow data of the video data, the optical flow data indicating motions of pixels between frames of the video data, and encoding the received video data into video localization data comprising information associating pixels in the frames of video data with different channels of sound.

24 Claims, 6 Drawing Sheets

(51) Int. Cl.
G06N 3/088 (2023.01)
G06V 10/764 (2022.01)
G06V 10/82 (2022.01)

(52) U.S. Cl.
CPC .............. *G06V 20/41* (2022.01); *G06V 20/46* (2022.01); *G06V 20/48* (2022.01)

(56) References Cited

U.S. PATENT DOCUMENTS

| | | | |
|---|---|---|---|
| 2004/0019899 A1* | 1/2004 | Pelletier | H04N 21/4223 348/E5.002 |
| 2009/0322915 A1 | 12/2009 | Cutler | |
| 2011/0221975 A1 | 9/2011 | Kon | |
| 2016/0180865 A1 | 6/2016 | Citerin et al. | |
| 2017/0337425 A1* | 11/2017 | Lee | G06V 20/52 |
| 2018/0343413 A1 | 11/2018 | Herd et al. | |
| 2019/0333198 A1* | 10/2019 | Wang | G06T 5/50 |
| 2019/0341058 A1* | 11/2019 | Zhang | G06N 3/045 |
| 2020/0335121 A1* | 10/2020 | Mosseri | G06F 18/214 |
| 2020/0342234 A1* | 10/2020 | Gan | G06V 10/82 |
| 2021/0074267 A1* | 3/2021 | Higurashi | G10H 1/0008 |
| 2021/0217182 A1* | 7/2021 | Li | G06N 3/044 |

FOREIGN PATENT DOCUMENTS

| | | |
|---|---|---|
| GB | 2597162 B | 3/2023 |
| JP | 2010-219786 A | 9/2010 |
| JP | 2018036359 A | 3/2018 |
| JP | 2022529553 A | 6/2022 |
| WO | 2020217165 A1 | 10/2020 |
| WO | 2022059858 A1 | 3/2022 |

OTHER PUBLICATIONS

Zhao et al "The Sound of Motions" Apr. 11, 2019 arXiv:1904.05979 (Year: 2019).*
Mel, et al. "The NIST Definition of Cloud Computing". Recommendations of the National Institute of Standards and Technology. Nov. 16, 2015.
Andrew Owens, et al., "Audio-Visual Scene Analysis with Self-Supervised Multisensory Features", arXiv:1804.03641v2 [cs.CV] Oct. 9, 2018.
Yang Gao, et al., "Voice Impersonation Using Generative Adversarial Networks", arXiv:1802.06840v1 [cs.SD] Feb. 19, 2018.
Y.Cem Subakan, et al., "Generative Adversarial Source Separation", arXiv:1710.10779v1 [cs.SD] Oct. 30, 2017.
Ruohan Gao, et al., "Learning to Separate Object Sounds by Watching Unlabeled Video", arXiv:1804.01665v2 [cs.CV] Jul. 26, 2018.
Bertrand Rivet, et al., "Audiovisual Speech Source Separation: An Overview of Key Methodologies", http: //hal.archives-ouvertes.fr/hal-00990000, May 13, 2014.
Zhe-Cheng Fan, et al., "SVSGAN: Singing Voice Separation via Generative Adversarial Network", arXiv:1710.11428v2 [cs.SD] Nov. 13, 2017.
Hang Zhao, et al., "The Sound of Pixels", arXiv:1804.03160v4 [cs.CV] Oct. 14, 2018.
International Search Report dated Jul. 24, 2020, in related co-pending Application No. PCT/IB2020/053754.
Ye, et al., Speech Enhancement Based on A New Architecture of Wasserstein Generative Adversarial Networks, , 11$^{th}$ International Symposium on Chinese Spoken Language Processing, Nov. 29, 2018, (Nov. 29, 2018).
Li, et al., "See and listen: Score-informed association of sound tracks to players in chamber music performance videos", IEEE International Conference on Acoustics, Speech, and Signal Processing Mar. 9, 2017 (Mar. 9, 2017).
United States Notice of Allowance dated Jul. 13, 2022 in U.S. Appl. No. 16/394,261.
Patents Act 1977: Examination Report under Section 18(3) dated Oct. 19, 2022, in corresponding Great Britain Patent Application GB21156476.
German Patent and Trademark Office, "Examination request", Feb. 9, 2024, 19 pages, DE Application No. 112020000548.8.
Li, et al., "See and listen: Score-informed association of sound tracks to players in chamber music performance videos," 2017 IEEE International Conference on Acoustics, Speech and Signal Processing (ICASSP) [conference paper], Mar. 2017, pp. 2906-2910, DOI: 10.1109/ICASSP.2017.7952688, Retrieved from the Internet: <URL: https://ieeexplore.ieee.org/document/7952688>.
Torres-Reyes, et al., "Audio Enhancement and Synthesis using Generative Adversarial Networks: A Survey," International Journal of Computer Applications [article], Jan. 2019, pp. 27-31, vol. 182, No. 35, DOI:10.5120/ijca2019918334, Retrieved from the Internet: <URL: https://www.researchgate.net/publication/330451432_Audio_Enhancement_and_Synthesis_using_Generative_Adversarial_Networks_A_Survey>.
Ye, et al., "Speech Enhancement Based on A New Architecture of Wasserstein Generative Adversarial Networks," 2018 11th International Symposium on Chinese Spoken Language Processing (ISCSLP) [conference paper], Nov. 2018, 5 pages, DOI: 10.1109/ISCSLP.2018.8706647, Retrieved from the Internet: <URL: https://ieeexplore.ieee.org/document/8706647>.
Japanese Patent Office, "Notice of Reasons for Refusal," Japanese Patent Office, Nov. 30, 2023, 6 pages, JP Patent Application No. 2021-538661, Translated.

* cited by examiner

For Training With Paired Data, the Ground Truth is Known:

$$\hat{s}_1(n,t) = \frac{1}{N_1} \sum_{(x,y) \in \mathcal{R}_1} \hat{s}(n,t;x,y)$$

$$\hat{s}_2(n,t) = \frac{1}{N_2} \sum_{(x,y) \in \mathcal{R}_2} \hat{s}(n,t;x,y)$$

For Training With Paired Data, the Training Goal is to Minimize Reconstruction Loss + Adversarial Loss:

$$\min \mathbb{E}[\|\hat{s}_1(n,t) - s_1(n,t)\|_2^2 + \|\hat{s}_2(n,t) - s_2(n,t)\|_2^2] + \mathbb{E}\left[f\left(1 - D_{r/f}(\hat{s}_1(n,t))\right) + f\left(1 - D_{r/f}(\hat{s}_2(n,t))\right)\right]$$

FIG. 3

For Training Without Paired Data, the Training Goal is to Minimize Adversarial Loss:

$$\min \mathbb{E}\left[f\left(1 - D_{r/f}(\hat{s}(n,t;x,y))\right) + f\left(1 - D_{r/f}(\hat{s}(n,t;x,y))\right)\right]$$
$$+ \mathbb{E}\left[f\left(1 - D_{n/c}(\hat{s}(n,t;x,y))\right) + f\left(1 - D_{n/c}(\hat{s}(n,t;x,y))\right)\right]$$
$$+ \mathbb{E}\left[\left\|s(n,t) - \sum_{x,y} \hat{s}(n,t;;x,y)\right\|_2^2\right]$$

AUDIOVISUAL SOURCE SEPARATION AND LOCALIZATION USING GENERATIVE ADVERSARIAL NETWORKS

The present Application is a Continuation Application of U.S. patent application Ser. No. 16/394,261, which was filed on Apr. 25, 2019, the entire contents of which are hereby incorporated by reference.

BACKGROUND

The present invention relates generally to source separation. More specifically, sound sources are localized to specific pixels in video frames, using temporal information from motion information in the video images for localizing sound and a Generative Adversarial Network (GAN) improves the naturalness of the localized sound(s).

Source separation refers to the task of separating a mixture of multiple audios. Source separation is one of the most heated research areas in speech because the ability to process speech in the presence of interference and noise is important for commercial speech processing systems.

Audiovisual source separation is an important class of source separation that utilizes visual cues, e.g., videos. Video information is expected to improve separation performance because it lends many useful cues, such as motion concurrence, instrument movement for music separation, and lip movement for speech separation. Recently, deep learning approaches have been applied to audiovisual source separation and have achieved impressive results.

For example, one video-based source separation system PixelPlayer, as developed with participation of one of the coinventors of the present invention, is described in an article "The Sound of Pixels." A demonstration is provided at a website under an Internet search using this article's title name or simply "PixelPlayer." PixelPlayer produces sounds and separates input sounds into a set of components that represents sound from each pixel of video image data. The system is trained using a number of videos including one or two people playing various instruments, along with a mono auditory input associated with the video data. Because visual and audio modalities are synchronized, the PixelPlayer system can learn audio-visual source separation and localization, splitting the input sound signal into N sound channels, each corresponding to a different instrument category, and can localize the sounds and assign different audio waves to each pixel in the input video.

However, an important problem with these source separation approaches, such as PixelPlayer, is that the output speech/music does not sound natural enough.

SUMMARY

The present invention addresses this and other audiovisual source separation problems.

In accordance with an exemplary embodiment, the present invention discloses a method (and apparatus and computer product) for a method for sound source separation in video data, including receiving video data including visual data associated with a plurality of sound sources into a video encoder module; concurrently receiving into the video encoder module optical flow data of the video data, the optical flow data indicating motions of pixels between frames of the video data; encoding, in the video encoder, the received video data into localization data comprising information for associating different sound sources to different pixels in the frames of video data; and encoding, in the video encoder, the received optical flow data into separation data comprising visual cue information for isolating the different sound sources in the frames of video data.

In accordance with another exemplary embodiment, also disclosed herein is a method for an audiovisual source separation processing, including providing a Generative Adversarial Network (GAN) system comprising a plurality of Deep Neural Networks (DNNs) configured to comprise a GAN generator and a GAN discriminator, the GAN generator configured to receive video frame data and associated optical flow frame data indicating pixel motion between the video frames; providing an audio receiver to receive audio associated with the video frame data, the audio receiver including a Short-Time Fourier Transform (STFT) function to convert the associated audio into spectrogram data comprising a listing of values for different frequency bins n at a time t; providing an input to receive a selection of a pixel of the video frame data as a selected pixel; mixing spectrogram data for the selected pixel with the associated audio in an audio synthesizer and providing an output of the audio synthesizer into an Inverse Short-Time Fourier Transform (ISTFT) function; and providing an output of the ISTFT function as output audio of the selected pixel.

In accordance with another exemplary embodiment, also disclosed herein is a method for an audiovisual source separation processing, the method including training a Generative Adversarial Network (GAN) system comprising a plurality of Deep Neural Networks (DNNs) configured to comprise a GAN generator and a GAN discriminator, the GAN generator configured to receive video frame data and associated optical flow frame data indicating pixel motion between the video frames, wherein the training comprises receiving a plurality of different video clips into the GAN generator and, using a gradient descent training process, training the GAN generator to generate candidates attempting to fool the GAN discriminator while training the GAN discriminator to correctly identify whether the candidates are real/fake or clean/mixture.

In accordance with another exemplary embodiment, also disclosed herein is a method of training a Generative Adversarial Network (GAN) system used for audiovisual source separation, the GAN system comprising a plurality of Deep Neural Networks (DNNs) configured to comprise a GAN generator and a GAN discriminator, the GAN generator configured to receive video frame data and associated optical flow frame data indicating pixel motion between the video frames, the training method including receiving a plurality of different video clips into the GAN generator; applying a gradient descent training process to the DNNs of the GAN generator to train the GAN generator to generate candidates attempting to fool the GAN discriminator; and applying the gradient descent training process to the GAN discriminator to train the GAN discriminator to correctly identify whether the candidates are real/fake or clean/mixture.

In accordance with yet an exemplary embodiment, also disclosed herein is an audiovisual source separation system including a Generative Adversarial Network (GAN) system comprising a plurality of Deep Neural Networks (DNNs) to comprise a GAN generator and a GAN discriminator, the GAN generator configured to receive video frame data and associated optical flow frame data indicating pixel motion between the video frames; an audio receiver configured to receive audio associated with the video frame data, the audio receiver including a Short-Time Fourier Transform (STFT) function to convert the associated audio into spectrogram data comprising a listing of values for different frequency bins n at a time t; an input to receive a selection of a pixel of the video frame data as a selected pixel; an audio synthesizer configured to mix spectrogram data for the selected pixel with the associated audio in an audio synthesizer; and an Inverse Short-Time Fourier Transform (ISTFT) function configured to receive an output of the audio synthesizer and to provide as output thereof an output of audio of the selected pixel.

DETAILED DESCRIPTION

Figure 1:
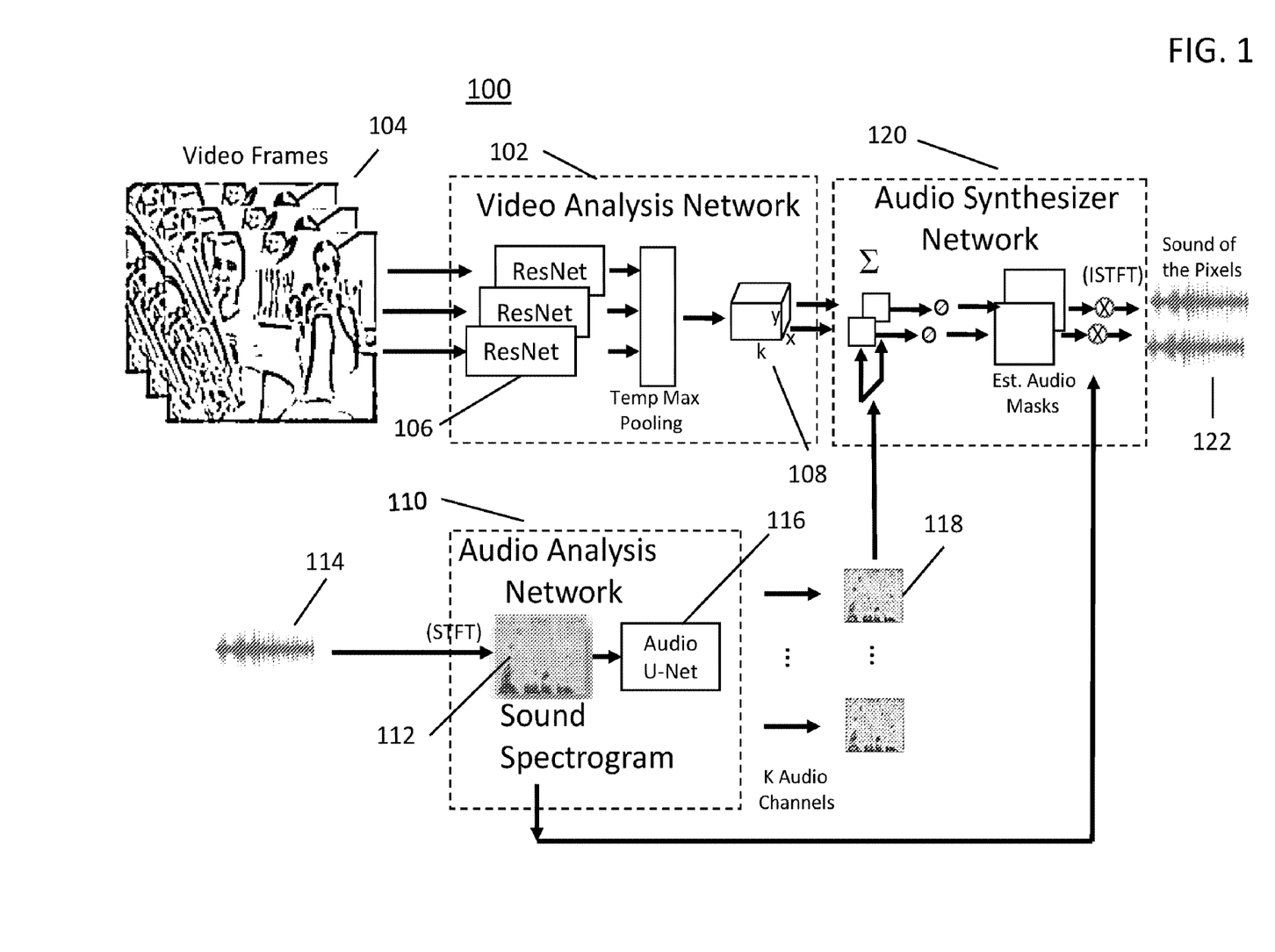
FIG. 1 shows architecture of a conventional audiovisual source separation circuit, as used in PixelPlayer.

To better explain the present invention, an explanation is first given of explaining in more detail the architecture 100 of the conventional audiovisual PixelPlayer separation circuit, as mentioned in the introduction.
The PixelPlayer System As shown in FIG. 1, the PixelPlayer 100 includes a video analysis network 102, an audio analysis network 110, and an audio synthesizer network 120.

The video analysis network 102 extracts visual features from video frames 104, using a dilated variation of ResNet-18 to process input video of size T×H×W×3, where T is the number of frames. The ResNet stack 106 extracts per-frame features with size T×(H/16)×(W/16)×K, where K is the number of audio sources/channels. After temporal pooling and sigmoid activation, a visual feature $i_k(x,y)$ 108 is obtained for each pixel of frame data, with size K, the number of sound sources used during training.

The audio analysis network 110 uses Short-Time Fourier Transform (STFT) to derive a sound spectrogram 112 from input audio 114, followed by transforming the spectrogram data into log-frequency scale data to be input into a U-Net (a form of convolutional neural network) architecture 116. The U-Net 116 splits the input sound into K components 118 $s_k$, k=(1, ... K) to thereby provide a time-frequency representation of the input sound as split into K channels. In the scenario shown exemplarily in FIG. 1, since there are two sound sources, one for each musician shown in video frames 104, one might assume that K=2. However, actually K is the total number of different instrument categories sampled in the dataset used for training, so that the k values identified above would typically correspond to any number of additional instruments than the two instruments exemplarily shown in FIG. 1 as input data, although contributions of various instrument types k could be zero in any specific video clip.

The audio synthesizer network 120 predicts sound by a vision-based spectrogram masking of the pixel-level visual feature $i_k(x,y)$ 108 with the audio feature $s_k$ 118. The output waveform 122 of the prediction is obtained by combining the predicted magnitude of the spectrogram with the phase of the input spectrogram and applying an inverse STFT.

A self-supervised training procedure is used for PixelPlayer that mixes sound from different videos to generate a complex audio input channel with a learning objective to separate a sound source of interest conditioned on its associated visual input. The training phase differed from a user phase in that N multiple videos were randomly sampled for the training set and their associated audio is mixed as input data, with the target being to train the neural networks to recover each audio with its associated visual input.

The PixelPlayer, the ResNet-18 stack 106 was modified to remove the last average pooling layer and fully connected (fc) layer, removing the stride of the last residual block and making the convolution layers in this block to have a dilation of 3, and adding a 3×3 convolution layer with K output channels. For each video sample, T frames with size 224×224×3 were used as input, with output being a feature of size K after spatiotemporal max pooling.

The U-Net of the audio analysis network was modified to have seven convolutions (or down-convolutions) and seven de-convolutions (or up-convolutions) with skip connections in between. The U-Net took an audio spectrogram with size 256×256×1 and an output of K feature maps of size 256×256×K.

The Present Invention

In considering the conventional approaches, such as PixelPlayer, to the task of audiovisual source separation, the present inventors recognized that limitations of such prior art systems include, at least:

the temporal information in video is not considered;
the output does not sound quite natural; and
the ground truth is unavailable.

Figure 2:
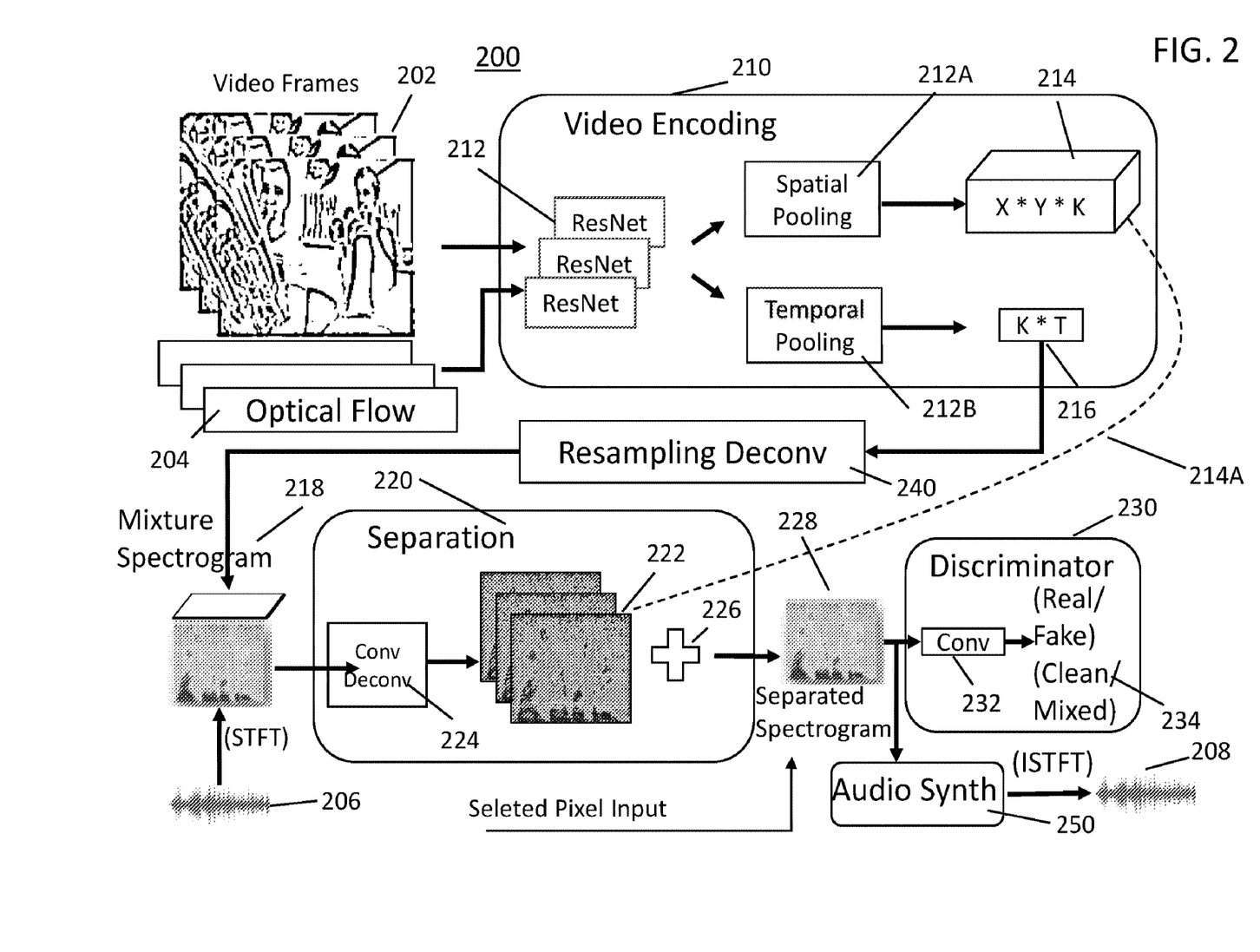
FIG. 2 shows an exemplary embodiment of the audiovisual source separation circuit of the present invention.

Similar to the technique of PixelPlayer and as exemplarily shown in FIG. 2, the present invention receives audio input 206 for conversion into spectrogram data 218, using SIFT, similar to the audio input 114 in the PixelPlayer shown in FIG. 1, and provides audio output via ISFTF for a selected pixel.

However, in response to the limitation they noted that output speech/music does not sound natural, the present inventors recognized that the Generative Adversarial Network (GAN) is a model capable of generating natural images/audios, since it has been demonstrated as potentially improving regular source separation performance, such as described by Pascual, et al., in "SEGAN: Speech Enhancement Generative Adversarial Network." Motivated by this observation, the present invention provides a novel source separation system that:

1) utilizes visual cues to assist separation by using motion detection of video as an input to localize sound in the video;
2) localizes each sound source on the video pixels; and
3) utilizes GAN to generate natural sounding output.

Thus, a problem formulation for the present invention was, given a mixture of sound spectrogram $s(n,t)=\Sigma_i s_i(n,t)$ and the corresponding video v(x,y, t), produce a location-based spectrogram estimate $\hat{s}(n,t;s,y)$ such that it truly corresponds to the sound the pixel emits, where x is a horizontal position index, y is a vertical position index, t is a frame index, and n is a frequency index, where S(n,t) denotes the spectrogram value at frame t and frequency bin n.

As an initial summary of the various modules of the present invention and to begin to explain differences from the mechanism described for PixelPlayer, the video encoding module 210 uses a neural network 212 to encode the relevant content and motion information in the input video stream into a pixel varying localization feature 214 and a time varying separation feature 216. The localization feature 214 provides information for associating different sources to different pixels in the video, and the separation feature 216 provides visual cues to the source separation module 220 for isolation of different sound sources from motion information.

The source separation module 220 takes the audio mixture spectrogram s(n,t) 218 (as derived from audio input 206, using STFF, similar to PixelPlayer) and the separation vector 216, to provide separation features 222 of the audio in accordance to separation along channels k. The separated features 222 are then associated to the pixels by using weights derived from data of the localization vector 214. More precisely, the weights are the 1×K subvectors from 214 that correspond to a particular pixel, so that each pixel of a frame is associated with weights corresponding to each of the k instrument categories used during training. Various weights $w_k(x,y)$ possibly would have a value equal to zero for any specific input video clip 202 if the sound of that channel is absent from the video clip.

The discriminator module 230, which is s similar to the discriminator used in SEGAN briefly mentioned above, provides a scalar 234 specifying if the input spectrogram is real or fake, which is a defining characteristic of GAN. The audio discriminator 230 predicts if an input spectrogram is real (ground truth single channel audio) or fake (separated results), conditioned on the localization vector 214.

Although FIG. 2 symbolically shows a single audio discriminator 230, there are actually two discriminator function provided by the discriminator symbol 230. One discriminator function discriminates if the audio is real or fake (which is used with paired video data), and the other discriminator function discriminates if the audio is clean or mixture (which is used in training without paired data). Which of the two discriminator functions is used depends upon the type of training video clip being used, and each discriminator function has a different objective function to be minimized when its type of training video clip is used, as explained later when training is described in more detail.

One of the goals of the source separation module 220 is to fool the audio discriminator module 230 (e.g., real/fake or clean/mixed). Thus, the present invention shown in FIG. 2, including the video encoding module 210 (having ResNet 212 and pooling layers 212A, 212B, resampling deconv module 240, and source separation module 220 (including summer 226) and the audio discriminator module 230 together form a GAN system, one of the distinguishing characteristics of the present invention having the purpose enhanced separated audio, with the video encoding module 210, the resampling deconv module 240, and the source separation module 220 together forming the generator component of the GAN system, and the discriminator module 230 serving as the discriminator component.

Once training of the three neural networks 212, 224, 232 of the GAN is complete, as will be described later, the system 200 applies the phase of the mixture spectrogram 218 to the separated features 222, and then the system performs overlap-add 226 and inverse Short-Time Fourier Transformation (ISTFT) to recover the waveform of interest 208, as sound from the selected pixel.

User input devices, such as a keyboard and/or a pointer device such as a mouse as might be used for pointing to specific pixels in a display, as well as a display output device and audio output circuit, are not shown in FIG. 2 since they are considered well known in the art and not part of the novelty of the present invention. Additionally, a processor(s) that would be used to implement the components in FIG. 2, as well as implement the training of the networks by executing the calculations of the training functions described below, is also not shown in FIG. 2, since this aspect is considered to be well known in the art.

Additional details of primary components and operations will now be described.

The Video Encoding Module

As mentioned above, the video encoding module 210 encodes the relevant content 202 and motion information 204 in the input video information into a pixel varying localization feature 214 and a time varying separation feature 216. The separation feature 216 provides visual cues to the source separation module 220, and the localization feature 214 is used to associate difference sources to different pixels on the video. Ideally, if the training of the present invention were perfect, the only pixels of the input video 202 exemplarily shown in FIG. 2 having an associated sound on an output video display would be the pixels of the image data showing motion in the area around the two instruments due to movements of the two musicians, and any other pixels such as stationary background pixels would have no associated sound. The present invention would provide the audio sound 206 for that instrument, as gleaned from the audio stream portion of the input video 202 and as enhanced by the GAN neural networks.

The video encoding module 210 improves over that described in the conventional method used in, for example, PixelPlayer, by adding the separation vector that provides separation feature 216, so that the visual information can assist separation, instead of only performing localization available from the localization feature 214. The parameter K, also referred herein as "channels", might initially be considered as relating to different areas of pixel motion in the video input data to the different sound features. However, more accurately the parameter K relates to which of different instruments are included in a database of instruments used in different video clips during training the system. Thus, a key feature is that the neural networks incorporated by the GAN system of the present invention are being trained to enhance sounds of different instruments.

The video encoding module 210 is somewhat similar to that used in PixelPlayer, which is a stack 212 of 2D convolutional layers on each single input frame in that the ResNet modules are configured similar to the description for the PixelPlayer. However, there are two important distinctions. First, in addition to the raw video, the encoding module 210 of the present invention also takes the motion image data of each frame of the raw video as Optical Flow input data 204, so the ResNet stack 212 of the present invention includes additional ResNet units dedicated to this optical flow data. It is further noted that each frame of the video frames 202 and each frame of the optical flow frames 204 is provided into an associated respective ResNet of the ResNet stack 212, so that there are actually six ResNet units in the stack 212 in a preferred exemplary embodiment. This uniqueness to respective associated ResNet units to each frame unit of input data is similar to the video input 104 shown in FIG. 1 except that the present invention also includes ResNet units for the optical flow 204 data derived from image motion data of the video frames 202.

Second, after the initial Convolutional Neural Network (CNN) layers (i.e., the ResNet layers 212), the encoding module 210 is divided into two branches, 212A, 212B. The first branch 212A performs mean pooling across the spatial dimension, which is similar as done in PixelPlayer. The output of this branch is called the localization feature 214 of size X\*Y\*K, where X, Y, K are width, height, and feature dimensions, respectively, as a three-dimensional tensor of size X by Y by K, corresponding to the pixel feature fp(x,y,k) described shortly. The second branch 212B applies additional CNN layers to further reduce the temporal dimensions and finally performs mean pooling across the temporal dimensions. The output of this branch is called the separation feature 216 of size T\*K, where T is the number of video frames.

Inputs into the video encoder 210 include video frame data v(x,y,t) 202 and optical flow data o(x,y,t) 204, where x is the horizontal position index, y is the vertical position index, t is the video frame index. The K parameter data in the present invention is derived in part from the optical flow input data 204, and the optical flow data 204 is, in turn, extracted from video frame data 202 as motion features within the video data 202, using conventional motion feature detection techniques well known in the art of video compression/decompression to indicate the motion of pixels, typically in units of blocks of pixels, between frames of video data.

As demonstrated in this exemplary embodiment of the present invention, the ResNet stack 212 is a stack of Residual Network (ResNet) layers trained to learn residuals from the image data 202 and optical flow data 204. As known in the art, a residual is a subtraction of features learned in a layer from input to that layer, and underlying the development of the ResNet concept is the realization that the deeper a deep convolutional neural network becomes, the more difficult is training and accuracy begins to degrade. The ResNet approach has been demonstrated to address both of these concerns. Thus, although the ResNets are used in a preferred exemplary embodiment, the present invention should not be considered as confined to this specific exemplary embodiment based on the ResNet neural network architecture, since other neural net mechanisms could be used achieve the functions/result of this specific neural network type.

The two pooling layers 212A, 212B could provide either averaging or taking of maximums, meaning that these pooling layers could be either mean-pooling or max-pooling layers. The spatial pooling layer 212A provides the pixel feature vector $f_p(x,y,k)$ 214 and the temporal pooling layer 212B provides the temporal feature vector $f_\tau(t,k)$ 216, where τ indicates the time domain. The dotted line 214A in FIG. 2 indicates that the pixel feature vector data 214 provides weight information for processing in the separation module 220, as a mechanism to associate sounds to different pixels. More specifically, the weights 214A used in the separation module 220 are the 1-by-K subvectors that correspond to the chosen pixel in the pixel feature vector data 214, given that the pixel feature vector data $f_p(x,y,k)$ 214 is an X×Y×K weight tensor. Thus, for each chosen pixel, (x,y) in the extracted features 222, there are K weights, since the total weight tensor 214 is X×Y×K and since there are X×Y pixels in each extracted feature 222.

The Resampling Deconv Module

The present invention involves two temporal resolutions: (1) The video frame rate; and (2) the spectrogram frame rate. The video frame rate is usually 12-24 frames per second. The spectrogram 218 frame rate is usually 100 frames per second. The video frame rate gets unified with the spectrogram data 218 via the "resampling deconv" module 240, thereby associating the video frame data 202 with associated audio input data 206.

The output of the resampling deconv module 240 is associated with the mixture spectrogram s(n,t) 218, where n is a frequency index and t is video frame time, as derived by STFT filtering processing of audio input 206. The mixture spectrogram 218 is stored in a memory buffer in increments of video frames, as indicated by the "plate" symbology over the mixture spectrogram 218, and the mixture spectrum data 218 includes spectrum data for all K channels. So the next module, the separation module 220, has the function of separating the mixture spectrogram frames 218 into separate channel components for the K different sound sources in the video data.

The Source Separation Module

The ConvDeconv module 224 in the source separation module 220 is a neural network that extracts features from the mixture spectrogram frames s(n,t) 218 based on different channels k, to provide extracted feature 222. The extracted features 222 are somewhat related to the spectrograms because the weighted combination of these extracted feature frames 222 become the separated spectrogram frames 228. Therefore, it is noted that the exemplary three extracted feature frames 222 do not correspond to the three input video frames 202, but is intended as associated to different channels k of the K channels, remembering that there are K spectrogram features. Because this ConvDeconv neural network is part of the GAN, the extraction mechanism defined in this neural net is based on weight adjustments from back propagation during the training of the overall GAN system introduced by the present invention. The extracted features $f_s(n,t,k)$ 222 are associated to pixels of video data, using weights provided by the localization vector 214 from the encoder 210. The "+" sign 226 in the separation module 220 indicates a linear addition of different features 222 for each pixel. Thus, given a pixel location (x,y) and its pixel feature $f_p(x,y,k)$ from the video encoder 210, the separated spectrogram 228 output from the separation module 220 is:

$$\hat{s}(n, t; x, y) = \sum_k f_s(n, t, k) f_p(x, y, k).$$

From this equation above, the separated spectrograms 228 consist of the product of the k features 222 (e.g., $f_s(n, t, 1)$, $f_s(n, t, 2) \ldots f_s(n, t, k)$) and the k linear combination weights 214 from the video encoder 210 (e.g., $f_p(x,y,1)$, $f_p(x, y,2) \ldots f_p(x,y,k)$ are the k linear combination weights 214 from encoder 210). The k features are weighted (multiplied) by the weights and then added up to form the separated spectrograms 228.

The present invention implements the function of deriving audio spectrogram data similar to that described in FIG. 1, by using the STFT filtering function on audio input 206 to derive the mixture spectrogram 218. The functions performed by the audio U-Net 116 in the PixelPlayer of FIG. 1 is performed by the ConvDeconv NN 224 to derive the separated features 222, similar to the audio features 118 of FIG. 1 in the PixelPlayer. Additionally, similar to the audio analysis network 110 and the audio synthesizer network 120 of shown in FIG. 1 for PixelPlayer, the separation module 220 provides a summation function 226 and the audio synthesizer 250 provides ISTFT to provide audio output 208.

But the audio processing of the present invention differs from PixelPlayer's mechanism is at least two important ways.

First, in addition to the mixture spectrogram 218, the method of the present invention also takes the separation feature vectors 216 from the video encoding module 210 as input. As noted previously, the separation feature vectors 216 are derived from the optical flow data 204 as well as video data 202, which is novel in the present invention compared to the PixelPlayer. Also previously mentioned, the separation feature 216 is temporally resampled in the resampling deconv module 240 of the present invention, to match the frame rate of the audio spectrogram with that of the video frames, so that video timing matches audio timing that is developed from the audio input 206 in deriving the spectrogram data 218.

Second, the output of the source separation module 220 directly predicts the separated spectrograms 228, instead of predicting a time-frequency mask on the input spectrogram as done in PixelPlayer. The mask prediction predicts a matrix of masks valued between 0 to 1, the same size of the original mixture spectrogram. The mask times the input mixture spectrogram becomes the predicted separated spectrogram 228. This distinguishing feature shows in FIG. 2 by reason of presence of the separated spectrogram 228 in the present invention, rather than performing this function in the mask shown in FIG. 1, as is done in PixelPlayer.

The Discriminator Module

The audio discriminator module 230 provides the discriminator component of the Generative Adversarial Network (GAN) capability of the present invention, which discriminator function predicts, during initial training of the GAN system, if an input spectrogram is real (ground truth single channel audio) or fake (separated results), as having been conditioned on the localization vector 214. Thus, one of the goals of the ConvDeconv neural network 224 of the source separation module 220 (in combination with the ResNet stack 212 of the video encoder 210) is to fool the audio discriminator module 230 during training. Equations for achieving this training of the GAN system will be described shortly, and, as further explained, these neural networks 212, 224, 232, 240 are alternatively updated in a sequential manner during the initial GAN training.

However, to further explain the concept of "generative adversarial network", a GAN system is a class of machine learning systems in which two neural network contest each other in a zero-sum game framework, as a form of unsupervised learning. The GAN technique began as a technique in which photographs can be generated that look at least superficially authentic to a human observer by having at least some realistic characteristics. A GAN is implemented by using a first generative network to generate candidates while a second discriminative network evaluates the candidates, and the contest operates in terms of data distributions. The generative network learns to map from a latent space to a data distribution of interest, while the discriminative network distinguishes candidates produced by the generator from the true data distribution. The "Real/Fake" symbol 234 of FIG. 2 is intended as referring to the training objective of the generative network of the present invention to increase the error rate of the discriminative network. That is, in the present invention, the generative network GAN component 224 in the separation module 220 (in combination input from the ResNet component 212 and resampling deconv 240) attempts to "fool" the discriminator network component 232 in the discriminator module 230 by producing novel candidates that the discriminator neural network 230 determines as not synthesized, meaning that they are part of the true data distribution. A known dataset of video clips serves as the initial training data for the discriminator 232, and training it involves presenting the discriminator with samples from the training dataset, until it achieves acceptable accuracy.

A generator of a GAN system trains based on whether the generator succeeds in fooling the discriminator. A generator is typically seeded with randomized input that is sampled from a predefined latent space and thereafter candidates synthesized by the generator are evaluated by the discriminator, and backpropagation is applied in both the generative network and the discriminator network. The result is that the generator network learns to produce better images while the discriminator learns to better flag synthetic images. In a GAN system, the generator neural network is typically a deconvolutional neural network such as including conv deconv neural network 224, and the discriminator neural network is typically a convolutional neural network such as conv neural network 232.

As previously explained, the GAN processing in the present invention relates to providing more realistic audio as part of source separation and as improvement over conventional source separation systems such as PixelPlayer.

Similar to processing in the PixelPlayer system, the linear combination weights are determined differently during training and testing. During training, two videos of single channel audio are pieced together to form an artificial mixture. The weights representing each of the two channels are obtained from mean-pooling the localization feature over the pixels belonging to video of that channel. During testing (e.g., user phase), the true mixture video will be used, and the weights are the localization feature of one pixel. The separation result is expected to indicate what sound that pixel is making.

The discriminator module 230 is similar to the discriminator module in previously-mentioned Segan system, as described by Pascual, et al., which consists of a stack of convolutional layers followed by a mean pooling layers, followed by a stack of fully connected layers. The output, during training, of the discriminator 230 is a scalar specifying if the input spectrogram is real or fake (see label 234).

Finally, similar to the audio synthesizer network 120 of PixelPlayer shown in FIG. 1, the audio synthesizer network 250 includes a spectrogram inversion module that applies the phase of the mixture spectrogram to the separated spectrogram, and then performs inverse Short-Time Fourier Transformation (ISTFT) and overlap-add to recover the waveform and provide output audio 208.

The Training Phase

The training of the audiovisual source separation system of the present invention involves initial training of neural networks in FIG. 2: the neural network 212 in the encoder 210; the conv/deconv neural network 224 in the separator 220; and the conv network 232 in the discriminator 230. As mentioned, the neural networks 212 in the video encoder 210, the resampling deconv network 240, and the conv/deconv neural network 224 in the separator 220 together form the generator of the GAN system, and the conv network 232 of the discriminator module 230 forms the discriminator of the GAN system. The training procedure involves processing various algorithms to minimize/maximize, which would involve a processor not shown in either FIG. 1 or FIG. 2.

During training, various video clips with at least one sound source, typically at least two musicians each playing an instrument, are introduced and training involves using back propagation to adjust the neural networks to minimize a loss function, as is well known in the art. Updates during training of the three neural networks occurs alternatively in a sequence.

Typically, the training involves video clips with at least a pair of sound sources since the purpose of the sound source separation system is to separate sound from different sources and identify them with specific pixels in the video. The training video might include video clips with ground truth or without ground truth.

In the context of the present invention, the term "ground truth" refers to input video clips for which the sources of the individual sounds are known. Ground truth is known, for example, if a video clip is introduced with a single sound source, such as a single musician playing an instrument. However, since the purpose of the present invention is sound source separation, a better method of providing ground truth for purpose of training for sound separation is to artificially mix two individual videos, each with a single musician playing an instrument, to provide an input video clip with two known ground truths. However, discussed shortly, training can be done without knowing any ground truth, by adapting the optimization function for the generative and adversarial losses in the GAN.

First, however, the overall training loss function is explained, as follows.

The Loss Function

We denote the noisy spectrogram as x, and the separation module output as G(x; z), where z refers to the separation feature and localization feature. We denote the corresponding true clean spectrogram as y. (Note that the x, y, z parameters in this discussion is different from usage previously used.) We denote the discriminator output as D (y; z). During training, the goal of the generator of the GAN system is to minimize Eqn. 1 below and the goal of the discriminator of the GAN system is to maximize the generic Eqn. 2, which is more accurately reflected in Eqn. 3 and 4 below. The discriminator and generator perform gradient descent steps alternately.

$$L(G) = a\, E[\log D(G(x;z);z)] + b(G(x;z) - y)^2 \quad \text{(Eqn. 1)}$$

$$L\{D\} = E[\log D(y;z)] - E[\log D(G(x;z);z)] \quad \text{(Eqn. 2)}$$

In these equations above and below, D( ) denotes the output of the discriminator, G( ) denotes the output of the generator, x denotes input mixture, z denotes selected pixel position, and y denotes the ground truth clean audio corresponding to the pixel z.

Input: Any real spectrogram $s_{real}(n,t)$ and fake spectrogram $s_{fake}(n,t)$ Real/fake discriminator Output: determine if the input is real or fake.

$D_{r/f}(s_{real}(n,t))$ as high as possible $D_{r/f}(s_{fake}(n,t))$ as low as possible $$\text{Max Error}[f(D_{r/f}(s_{real}(n,t))) + f(1 - D_{r/f}(s_{fake}(n,t)))] \quad \text{(Eqn. 3)}$$

Noisy/Clean Discriminator $$\text{Max Error}[f(D_{n/c}(s_{clean}(n,t))) + f(1 - D_{n/c}(s_{noisy}(n,t)))] \quad \text{(Eqn. 4)}$$

Figure 3:
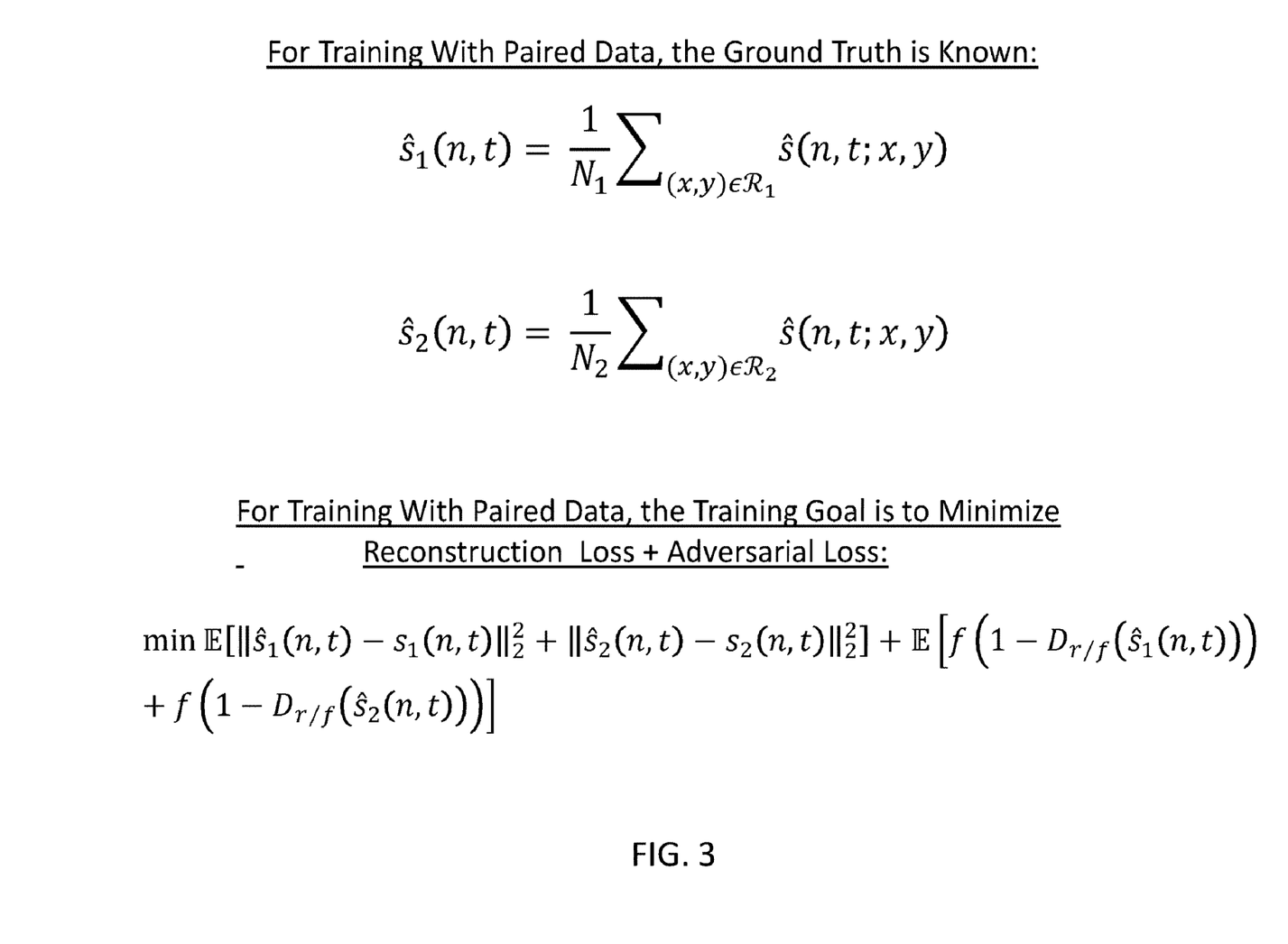
FIG. 3 shows equations relative to an exemplary training of the GAN generator using paired data.
Figure 4:
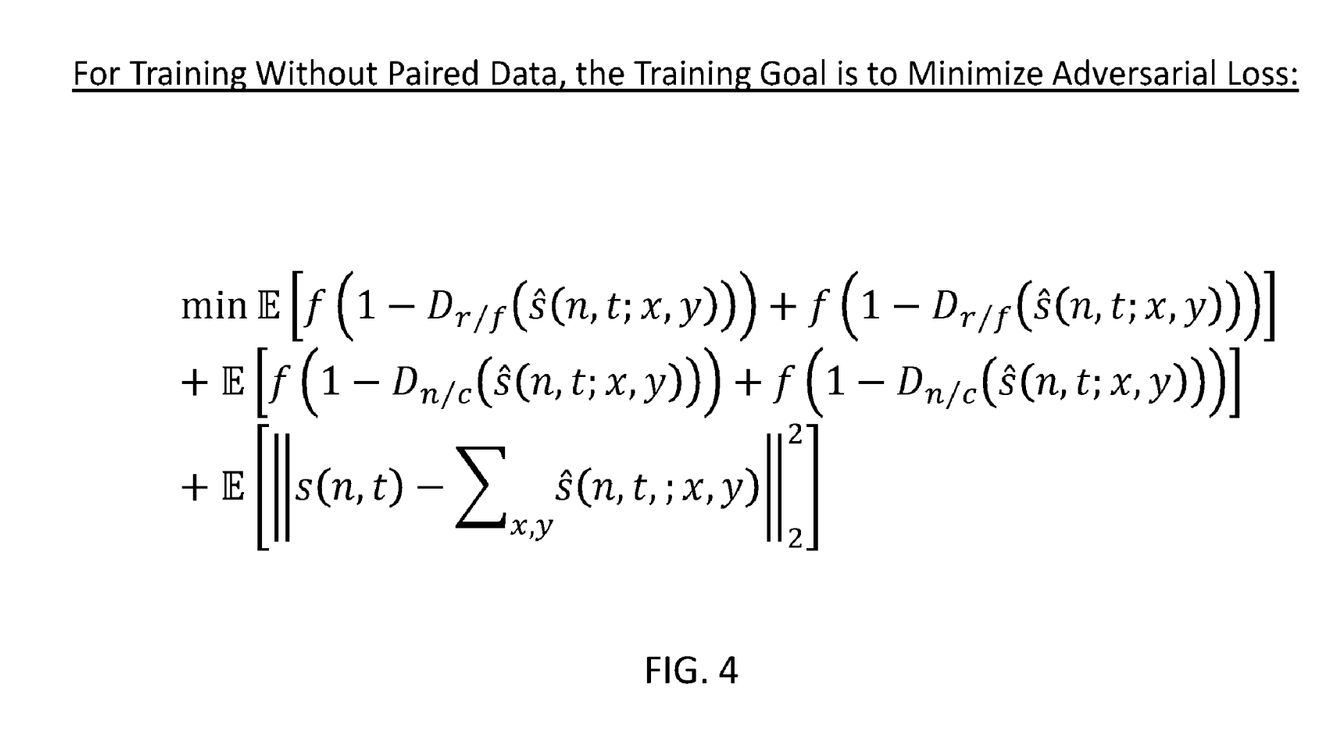
FIG. 4 shows exemplarily an equation for training the GAN generator without using paired data.
Figure 5:
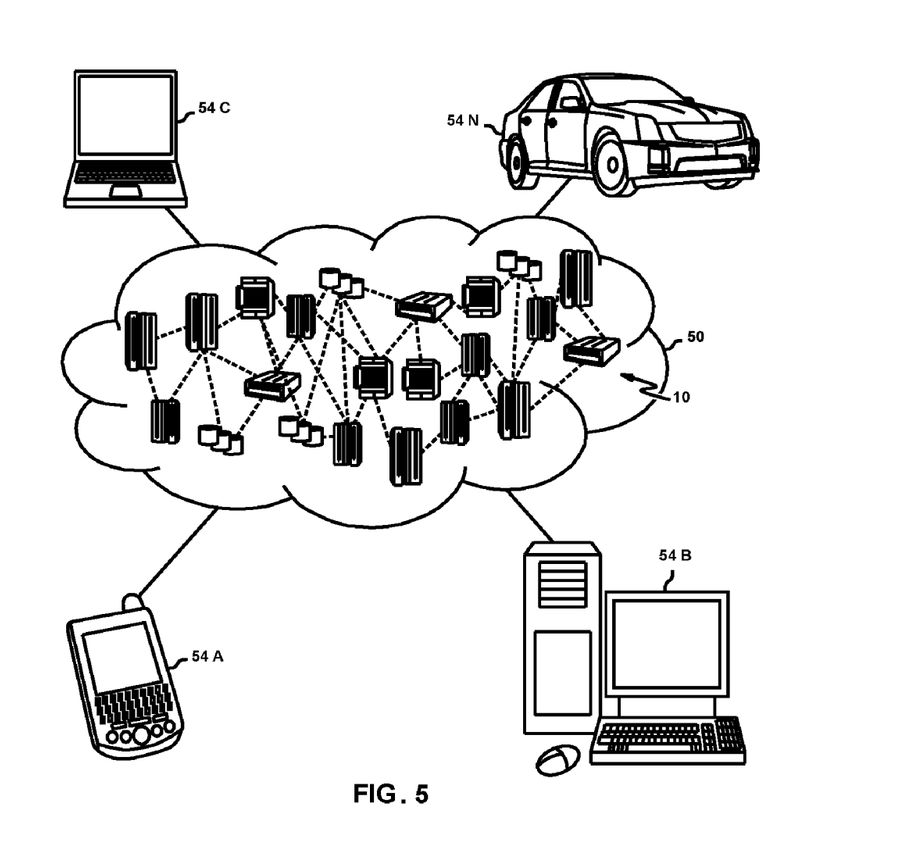
FIG. 5 shows a cloud computing environment according to an embodiment of the present invention.

FIG. 3 and FIG. 4 provide the equations for the GAN generator function and the goal of the generator is to minimize these equations, depending on whether training is or is not using paired data.

During the training phase and as previously mentioned, the three modules are updated alternately to minimize their respective losses. In other words, one module is updated after a first run, then another module is updated after a second run, then the remaining third module is updated after a third run and the sequence repeats. So, for example, the two players get updated in the following fashion: in round 1, the generator gets updated to reduce the values in FIG. 3 or FIG. 4, depending on whether training is using paired data, by gradient descend; in round 2, the discriminator gets updated to increase the value of the equation 2, by gradient ascend and this process repeats.

Training With Paired Data

When training video clips include paired data, the ground truth is known because the paired data results from mixing together video and audio from, for example, two individual video clips each having a single sound source such as a single musician playing an instrument.

For training with paired data, the ground truth is known in $s_1(n,t)$ and $s_2(n,t)$. We also know the pixels $\mathcal{R}_1$, $\mathcal{R}_2$ corresponding to the two sources. The separation module outputs $\hat{s}_1(n,t)$ and $\hat{s}_2(n,t)$ and are shown in the two top equations shown in FIG. 3.

When training with paired data, the goal of training the GAN generator networks is to minimize the reconstruction loss plus adversarial loss, as shown in the bottom equation in FIG. 3.

Training Without Paired Data

For training without paired data, the ground truth is not known in $s_1(n,t)$ and $s_2(n,t)$. Accordingly, the training goal is to minimize the adversarial loss, as shown in the equation in FIG. 4.

System Implementation

The present invention can be implemented in a number of various computer implementations, including, for example, a cloud service being offered as an application which permits the construction of the components of the present invention or as a player that demonstrates the result of using the components of the invention. The present invention could also involve a computer that has access to appropriate libraries that permit construction of the components of the present invention, with or without one or more neural network accelerators providing as a coprocessor to implement neural network capabilities.

Therefore, although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
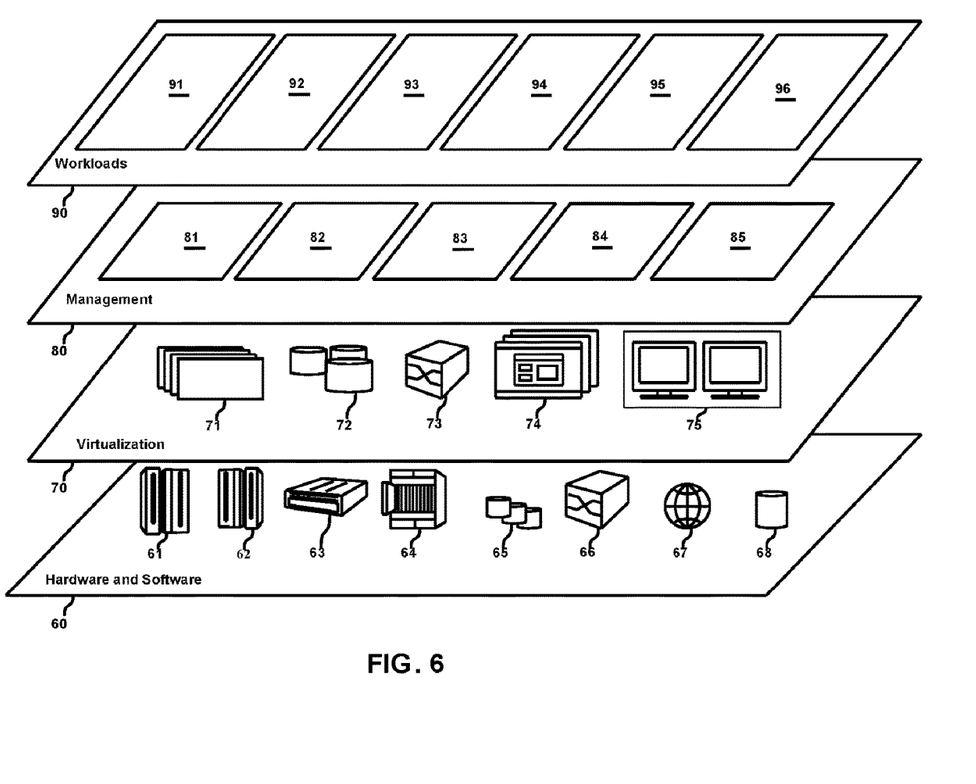
FIG. 6 depicts abstraction model layers according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the present invention in which audiovisual source separation is implemented as a cloud service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification. Thus, as previously mentioned, the concepts of the present invention could be incorporated in any Property Preserving Encryption (PPE) scheme and is not limited to Order Preserving Encryption (OPE) used to explain the invention.

Further, it is noted that, Applicants' intent is to encompass equivalents of all claim elements, even if amended later during prosecution.

What is claimed is:

1. A method for audiovisual source separation processing, the method comprising:
   receiving video data including images of a plurality of sound sources;
   receiving an optical flow data of the video data, the optical flow data indicating motions of pixels between frames of the video data; and
   encoding, by a generative adversarial network (GAN) system, the received video data into video localization data comprising information associating pixels in the frames of video data with different channels of sound; and
   encoding, by the GAN system, the received optical flow data into video separation data.

2. The method of claim 1, wherein the encoding the received optical flow data into video separation data comprises information associating motion information in the frames of video data with the different channels of sound.

3. The method according to claim 1, wherein receiving the video data showing images of a plurality of sound sources into a video encoder.

4. The method according to claim 1, wherein the encoding, in a video encoder, the received video data into video localization data comprises information associating pixels in the frames of video data with different channels of sound, and
   wherein the encoding, in the video encoder, the optical flow data that is received into video separation data comprises information associating motion information in the frames of video data with the different channels of sound.

5. The method of claim 1, where the encoding uses the GAN system to enhance a reconstruction of audio associated with the video data as sounds associated with different pixels in the video data, as based on the video localization data and on video separation data.

6. The method of claim 1, wherein the GAN system comprises a plurality of Deep Neural Networks (DNNs) comprising a generator and a plurality of Deep Neural Networks (DNNs) comprising a discriminator.

7. The method of claim 1, further comprising training one or more of the DNNs used in the GAN system during an initial training phase, the training comprising receiving a plurality of different video clips at a generator and, using a gradient descent training process, training the generator to generate candidates attempting to fool a discriminator while training the discriminator to correctly identify whether the candidates are real/fake or clean/mixture.

8. The method of claim 1, wherein the different channels of sound comprise a predetermined number of different sounds used in the plurality of different video clips of the initial training phase.

9. The method of claim 1, wherein the encoding to provide the video localization data and the encoding to provide video separation data uses a Deep Neural Network (DNN) for each frame of input data, the deep neural network being trained for the encoding during an initial training phase.

10. A method for audiovisual source separation processing, the method comprising:
    receiving video frame data and associated optical flow frame data indicating pixel motion between the video frames;
    receiving audio associated with the video frame data to convert the associated audio into spectrogram data comprising a plurality of values for different frequencies and time;
    providing an input to receive a selection of a pixel of the video frame data as a selected pixel;
    mixing the spectrogram data for the selected pixel with the associated audio for output; and
    encoding, by a generative adversarial network (GAN) system, the received optical flow data into video separation data.

11. The method according to claim 10, wherein the GAN system comprises a plurality of Deep Neural Networks (DNNs) comprising a generator and a discriminator, the generator configured to receive video frame data and associated optical flow frame data indicating pixel motion between the video frames.

12. The method according to claim 10, further comprising:
    providing an audio receiver to receive the audio associated with the video frame data, the audio receiver including a transform function to convert the associated audio into spectrogram data comprising a listing of values for different frequency bins at a predetermined time.

13. The method according to claim 10, wherein the mixing of spectrogram data is for the selected pixel with the associated audio in an audio synthesizer and providing an output of the audio synthesizer into an inverse transform function; and
    providing an output of the function as output audio of the selected pixel.

14. The method of claim 10, wherein DNNs of a generator are trained to encode the video frame data and the optical flow data into localization feature vectors that associate pixel locations within the video frames with sound channel data of the video and into separation feature vectors that associate motion information of the pixels with the sound channel data of the video.

15. The method of claim 10, as implemented by a cloud service, and further comprising associating spectrogram separation features with pixel locations using weight values of the localization feature vectors.

16. A method of training a network for audiovisual source separation, the training method comprising:
receiving a plurality of different data streams, wherein the data streams comprise audio associated with video frame data showing images involving a plurality of sound sources providing the audio;
processing the received audio in a transform function to convert the received audio into spectrogram data comprising a listing of values for different frequency bins at a time;
receiving as input data into the generator the video data showing the images involving the plurality of sound sources and optical flow data of the video data, the optical flow data indicating motions of pixels between frames of the video data;
applying a gradient training process to train a generator to generate candidates attempting to misdirect; and
identifying, by a discriminator, whether the candidates are authentic from the gradient training process.

17. The method according to claim 16, wherein the training comprises receiving a plurality of different video clips into the generator and, using the gradient training process, training the generator to generate candidates attempting to mislead the discriminator while training the discriminator to correctly identify whether the candidates are real/fake or clean/mixture.

18. The method according to claim 16, wherein a trained generator is configured to:
encode the received data into video localization data comprising information associating pixels in the frames of video data with the different channels of sound; and
encode the received optical flow data into video separation data comprising information associating motion information in the frames of video data with the different channels of sound.

19. The method according to claim 18, wherein the trained generator is configured to:
associate the video separation data for the different channels of sound with the spectrogram data to provide mixture spectrogram data; and
extract features from the mixture spectrogram data into audio extracted features as features extracted from the mixture spectrogram data as associated with different channels of the different channels of sound.

20. A system for an audiovisual source separation processing, the system comprising:
a computer readable storage medium storing instruction; and
a processor executing the instructions, the processor configured to:
receive video data including images of a plurality of sound sources;
receive optical flow data of the video data, the optical flow data indicating motions of pixels between frames of the video data;
encode, by a generative adversarial network (GAN) system, the received video data into video localization data comprising information associating pixels in the frames of video data with different channels of sound; and
encode, by the GAN system, the received optical flow data into video separation data.

21. The system according to claim 20, wherein the processor is further configured to:
receive audio associated with the video frame data, the audio receiver including a transform function to convert the associated audio into spectrogram data comprising a listing of values for different frequency bins at a time; and
receive a selection of a pixel of the video frame data as a selected pixel.

22. The system according to claim 20, wherein the processor is further configured to mix spectrogram data for a selected pixel with the associated audio; and receive an output of the mixing of the spectrogram data and to provide as output thereof an output of audio of the selected pixel.

23. The system of claim 20, wherein the processor is further configured to:
receive a plurality of different video clips into a generator;
apply a gradient descent training process to neural networks of the generator to train the generator to generate candidates attempting to mislead a discriminator; and
applying the gradient descent training process to the discriminator to train the discriminator to correctly identify whether the candidates are real/fake or clean/mixture.

24. An audiovisual source separation system, comprising:
a plurality of Deep Neural Networks (DNNs) comprising a generator and a discriminator, the generator configured to receive video frame data and associated optical flow frame data indicating pixel motion between the video frames; and
an audio receiver configured to receive audio associated with the video frame data, the audio receiver configured to include a transform function to convert the associated audio into spectrogram data comprising a listing of values for different frequency bins at a time.

* * * * *